United States Patent
Vandelli et al.

(10) Patent No.: US 12,333,233 B2
(45) Date of Patent: Jun. 17, 2025

(54) SIMULATION OF ATOMISTIC DEFECTS IN NANOELECTRONICS USING POLYHEDRAL MESHES

(71) Applicant: Applied Materials, Inc., Santa Clara, CA (US)

(72) Inventors: Luca Vandelli, Scandiano (IT); Matteo Bertocchi, Mirandola (IT); Stefano Dominici, Parma (IT); Luca Larcher, Reggio Emilia (IT)

(73) Assignee: Applied Materials, Inc., Santa Clara, CA (US)

( * ) Notice: Subject to any disclaimer, the term of this patent is extended or adjusted under 35 U.S.C. 154(b) by 624 days.

(21) Appl. No.: 17/670,446

(22) Filed: Feb. 12, 2022

(65) Prior Publication Data
US 2023/0259687 A1    Aug. 17, 2023

(51) Int. Cl.
G06F 30/30    (2020.01)
G06F 30/398   (2020.01)
G06T 7/70     (2017.01)
G06T 17/20    (2006.01)

(52) U.S. Cl.
CPC .............. G06F 30/398 (2020.01); G06T 7/70 (2017.01); G06T 17/20 (2013.01)

(58) Field of Classification Search
CPC ............ G06F 30/398; G06F 2111/08; G06F 2111/10; G06F 30/20; G06F 30/23; G06T 7/70; G06T 17/20; G06T 17/205
See application file for complete search history.

(56) References Cited

U.S. PATENT DOCUMENTS

| | | | | |
|---|---|---|---|---|
| 6,099,574 A | * | 8/2000 | Fukuda | G06F 30/23 703/14 |
| 2005/0146714 A1 | | 7/2005 | Kitamura et al. | |
| 2008/0106547 A1 | * | 5/2008 | Kataoka | G06T 17/20 703/6 |
| 2020/0184617 A1 | * | 6/2020 | Perron | G06T 7/38 |
| 2021/0035361 A1 | | 2/2021 | Dedhia | |
| 2021/0350058 A1 | * | 11/2021 | Bhattacharya | G06F 30/38 |

FOREIGN PATENT DOCUMENTS

| | | |
|---|---|---|
| JP | 3660137 B2 | 6/2005 |
| JP | 2007081055 A | 3/2007 |
| JP | 4847841 B2 | 10/2011 |

OTHER PUBLICATIONS

Application No. PCT/US2023/012732, International Search Report and Written Opinion, Mailed On May 17, 2023, 10 pages.

* cited by examiner

*Primary Examiner* — Jack Chiang
*Assistant Examiner* — Brandon Bowers
(74) *Attorney, Agent, or Firm* — Kilpatrick Townsend & Stockton LLP (57) ABSTRACT

A simulation of an electronic device may use a distribution of atomistic defects to provide more accurate results. An input mesh may be received representing a physical structure of the electronic device. This input mesh may be transformed into a polyhedral mesh to facilitate the simulation. A distribution of defects may then be generated and distributed throughout the polyhedral mesh. When performing each time step of the simulation, the effects of these defects may be attributed to individual cells in the polyhedral mesh and incorporated into the simulation equations for each volume. For example, charge and power contributions from the defects may be incorporated into the simulation equations to more accurately model the performance of the device.

20 Claims, 7 Drawing Sheets

SIMULATION OF ATOMISTIC DEFECTS IN NANOELECTRONICS USING POLYHEDRAL MESHES

TECHNICAL FIELD

This application generally describes a process for simulating a semiconductor mesh with a random distribution of defects. More specifically, this application describes translating a user-defined mesh into a polyhedral mesh to incorporate defect effects for efficient simulation.

BACKGROUND semiconductor process simulation may be used to model the behavior of semiconductor devices. Computer-aided design (CAD) tools may be used to design a virtual model of a semiconductor device that approximates the physical dimensions and behavior of the corresponding real-world device. The model may then be provided with simulated stimuli, such as voltages, currents, and/or other inputs that may cause the model to react. For example, modeling a device such as the channel of a transistor may include providing a simulated voltage to the gate of a model of the transistor. The ultimate goal of the simulation process is the accurate prediction of the behavior of the semiconductor device. This may include predicting charge movements or distributions, temperature fluctuations, dopant distributions, and/or any other physical or electrical state.

Although simulations may accurately predict the behavior of ideal devices, actual semiconductor devices that have been fabricated using semiconductor processes may include defects or other non-ideal characteristics that cause their actual performance to deviate from the simulated results.

SUMMARY

In some embodiments, a method of simulating atomistic defects in electronic devices may include receiving an input mesh representing a device for simulation; transforming the input mesh into a polyhedral mesh; generating a distribution of defects in the polyhedral mesh; and simulating a behavior of the device, where the behavior may be affected by the distribution of defects.

In some embodiments, a non-transitory computer-readable medium may include instructions that, when executed by one or more processors, cause the one or more processors to perform operations including receiving an input mesh representing a device for simulation; transforming the input mesh into a polyhedral mesh; generating a distribution of defects in the polyhedral mesh; and simulating a behavior of the device, where the behavior may be affected by the distribution of defects.

In some embodiments, a system may include one or more processors and one or more memory devices storing instructions that, when executed by the one or more processors, cause the one or more processors to perform operations including receiving an input mesh representing a device for simulation; transforming the input mesh into a polyhedral mesh;
generating a distribution of defects in the polyhedral mesh; and simulating a behavior of the device, where the behavior may be affected by the distribution of defects.

In any embodiments, any and all of the following features may be implemented in any combination and without limitation. Transforming the input mesh into the polyhedral mesh may include generating an external boundary that matches an outer geometry of the input mesh, and generating polyhedrons within the external boundary to form the polyhedral mesh. The method/operations may also include generating a distribution of points within an external boundary, and generating boundaries for polyhedra in the polyhedral mesh that are equidistant from points in the distribution of points. A density of the distribution of points may be provided as an input to the simulation corresponding to a specified resolution of the simulation. The polyhedral mesh may be more regular than the input mesh. The input mesh may represent a physical structure for a semiconductor material. The input mesh may include a user-defined mesh that uses more computing resources to simulate than the polyhedral mesh. Generating the distribution of defects in the polyhedral mesh may include converting the polyhedral mesh into a simplex grid. The simplex grid may include a regular mesh of tetrahedra. Generating the distribution of defects in the polyhedral mesh may include generating the distribution of defects based on a distribution function relative to the simplex grid, determining locations of the distribution of defects relative to the simplex grid, and/or using the locations of the distribution of defects with the polyhedral mesh when simulating the behavior of the device. The method/operations may also include, for each defect in the distribution of defects, identifying polyhedra in the polyhedral mesh that overlap with an effect of the defect, and distributing the effect of the defect to the polyhedra in the polyhedral mesh. Distributing the effect of the defect may include generating weights for each of the polyhedra that represent a corresponding effect of the defect distributed to each of the polyhedral. Simulating the behavior of the device may include computing charges for the distribution of defects, incorporating the charge into Poisson's equation for each affected polyhedra in the polyhedral mesh, computing power contributions for the distribution of defects, and/or incorporating the power contributions into Fourier's equation for each affected polyhedra in the polyhedral mesh. The method/operations may also include determining a tunneling trajectory for a defect in the distribution of defects as the defect moves between cells in the polyhedral mesh.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Before microelectronic and semiconductor-based circuits are fabricated and physically tested, the circuits are often simulated to model their functionality. This allows circuit designers the ability to test various materials and device configurations prior to the costly and time-consuming processes involved with physical prototyping. The embodiments described herein use a physics-based simulator that is configured to simulate the electron transport in semiconductor devices. Traditional physics-based simulations simulate the transport equations for drift and diffusion in a numerical sense. While these traditional simulations may be used to characterize ideal devices, they fall short when simulating semiconductor devices that include defects in the semiconductor layers. Therefore, to solve this technical problem, these methods add atomistic defects to the simulation process to more accurately characterize semiconductor devices for any type of mesh used to represent a material.

The embodiments described herein can accept any type of user-defined mesh and translate the user-defined mesh into a polyhedral mesh to make the simulation process more efficient on the computing system. The polyhedral mesh may then be transformed into a simplex grid that may be used to place a random distribution of defects within the material. The effects of these defects can then be distributed to any overlapping polygons in the mesh, and the continuum equations used in the simulation can be adjusted to account for the charge, temperature, and other contributions provided by these defects.

Figure 1:
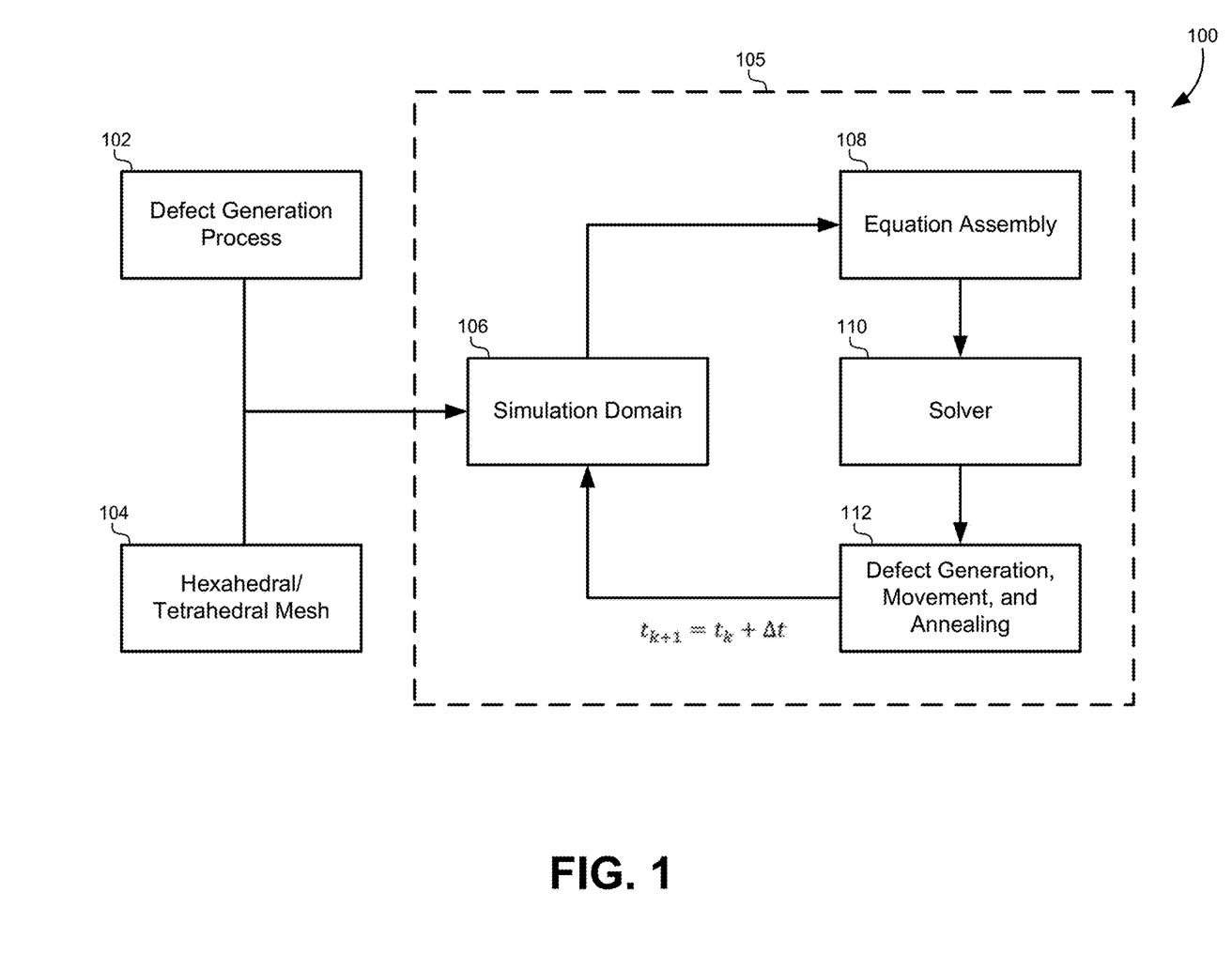
FIG. 1 illustrates a flowchart of a method for performing physics-based simulations that incorporate atomistic defects, according to some embodiments.

FIG. 1 illustrates a flowchart of a method for performing physics-based simulations that incorporate atomistic defects, according to some embodiments. The simulation may receive as an input a mesh 104. The mesh 104 may include a hexahedral mesh and/or a tetrahedral mesh. The mesh 104 may represent the physical structure of a corresponding material layer. For example, the mesh 104 may represent a lattice or physical structure of a semiconductor layer in a semiconductor device. Such a mesh 104 may be generated from a computer-aided design (CAD) tool for designing and simulating semiconductor circuits. For example, a circuit designer may define the physical structure of a semiconductor layer, including the physical dimensions and material used in the semiconductor layer. The CAD tool may then generate a representation of the mesh 104 to be used in the simulation process.

In addition to the mesh 104, some embodiments may generate a distribution of defects in the material layer being simulated. A defect generation process 102 may be used to randomly initialize a plurality of atomistic defects in the material of the mesh 104 to be used during the simulation process. For example, the defect generation process 102 may generate positions for the atomistic defects that are randomly generated on the mesh, where the electrical positions of the defects are randomized according to a probability distribution. The defect generation process 102 is described in greater detail below.

The mesh 104 and the random distribution of defects from the defect generation process 102 may be provided to a simulation domain 106. The simulation domain 106 may be part of a simulation loop 105 where equations are defined on the simulation domain and then solved versus time. Each step through the simulation loop 105 may represent a time step or time increment. At each time step, the simulation equations may be assembled by the equation assembly 108. For example, some embodiments may include continuum equations that are assembled using finite volume methods where unknowns are associated with mesh cells in the mesh 104. The defect distribution may also be incorporated into defect equations where unknowns are associated with the defects. These continuum equations may include Poisson's equation where the unknown variables represent the electrical potential, Fourier's equation where the unknown variables represent temperature, and/or charge continuity equations where the unknown variables represent the electron and/or hole density in the material. Defect equations may include charge continuity equations where the unknown variables represent the defect occupancies or the probability that a defect is filled with a charge.

The equation assembly 108 may couple the defect equations with the continuum equations. For example, in Poisson's equation, the charge associated with the defects may affect the computed potential. To account for this effect, the overlap between the defect volume and the mesh cells may be computed, and the defect charge may be distributed to the mesh cells. In Fourier's equation, the power dissipated out of the defects may affect the computed temperature in the simulation. To account for this effect, the overlap between the defect volume and the mesh cells may be computed, and the defect power may be distributed to the mesh cells. Finally, for the charge continuity equation, the defects may exchange charge with the mesh cells through a phenomenon known as Trap-Assisted Tunneling (TAT). To account for this effect, the process may compute the most favorable tunneling paths, and then exchange rates may then be incorporated into the corresponding defect and continuum equations. Each of these steps is described in greater detail below.

After the equation assembly 108, the simulation loop 105 may pass the equations to a solver 110. Any appropriate solver may be used, such as a non-linear solver based on Newton's method. Additionally, a second solver 112 may be used to account for the probability of discrete events associated with the defects. For example, a kinetic Monte Carlo solver may be used to simulate events such as the generation of new defects through bond breaking, the movement of existing defects through drift-diffusion, and the annealing of existing defects. For events that are generated by the kinetic Monte Carlo solver, the simulation domain may be updated and the modifications may be incorporated into the next time step of the time domain solution procedure when performing the next iteration of the simulation loop 105. Each of these steps is also described in greater detail below.

Figure 2:
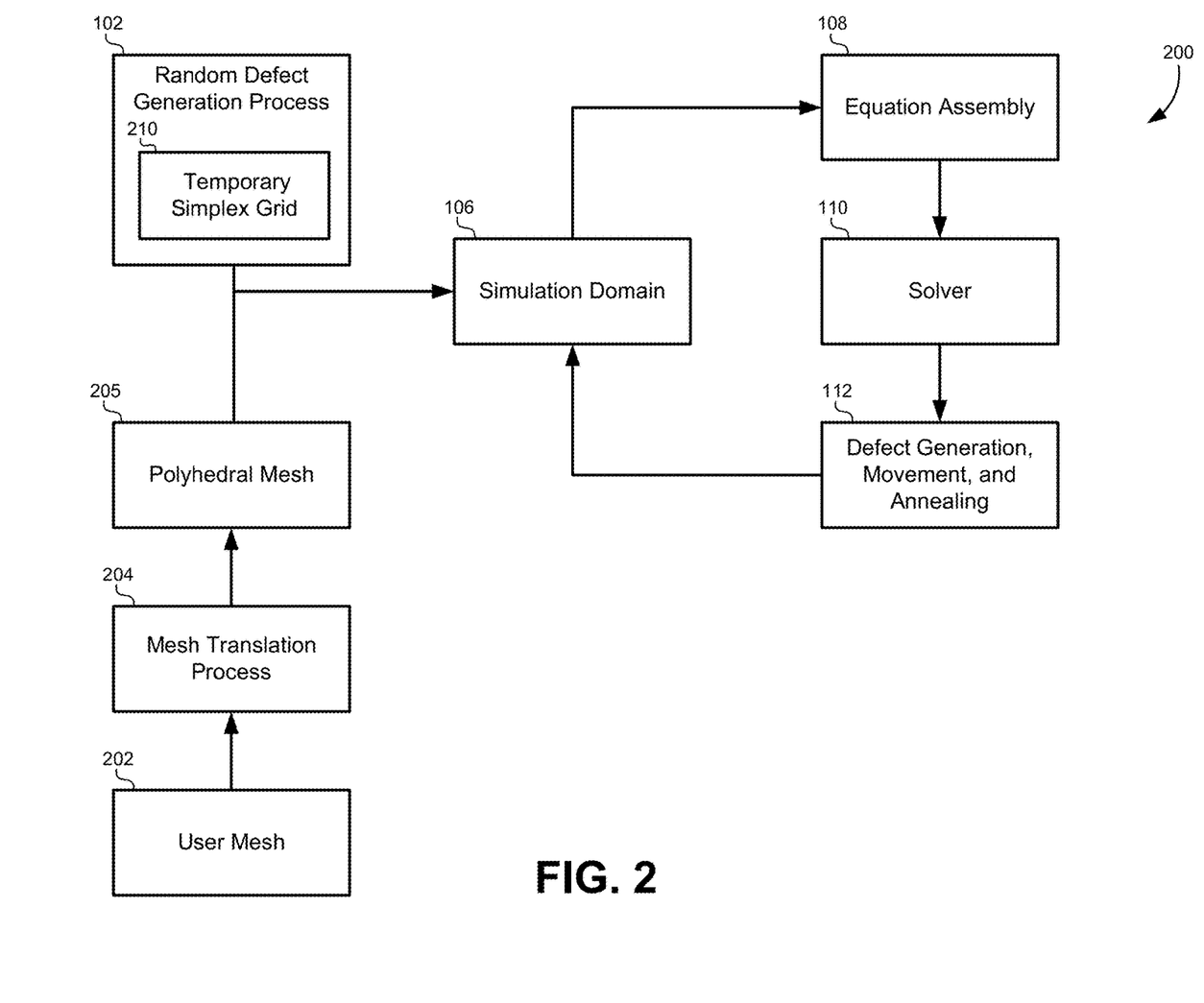
FIG. 2 illustrates a flowchart of a method for performing physics-based simulations that incorporate atomistic defects using polyhedral meshes, according to some embodiments.

FIG. 2 illustrates a flowchart of a method for performing physics-based simulations that incorporate atomistic defects using polyhedral meshes, according to some embodiments. These embodiments use any type of mesh that may be received from a modeling program, which allows for many different geometries and levels of complexity in the simulation process. These embodiments receive a mesh in any format, then translate this mesh into a polyhedral mesh that can be simulated efficiently. This translation process improves the simulation and operation of the computing system by reducing the complexities of a user-defined mesh into an efficient polyhedral mesh that can be simulated using less memory and/or computational power by the computing system (i.e., the user-defined mesh may use more computing resources to simulate than the polyhedral mesh).

User-defined meshes present a number of different technical challenges in the simulation process. This is particularly true with spherical surfaces or other complex geometries. For example, a custom mesh of triangles may commonly be used to represent curved surfaces. However, in order to simulate a material having this type of curved surface efficiently, these embodiments may translate the user-defined mesh into a polyhedral mesh. As used herein, the term "user-defined mesh" may include tetrahedral or hexahedral meshes, or any other type of mesh provided by a user to the simulation system. An input mesh may be defined as a mesh received as an input to the simulation, and thus an input mesh may include a user-defined mesh.

Figure 3:
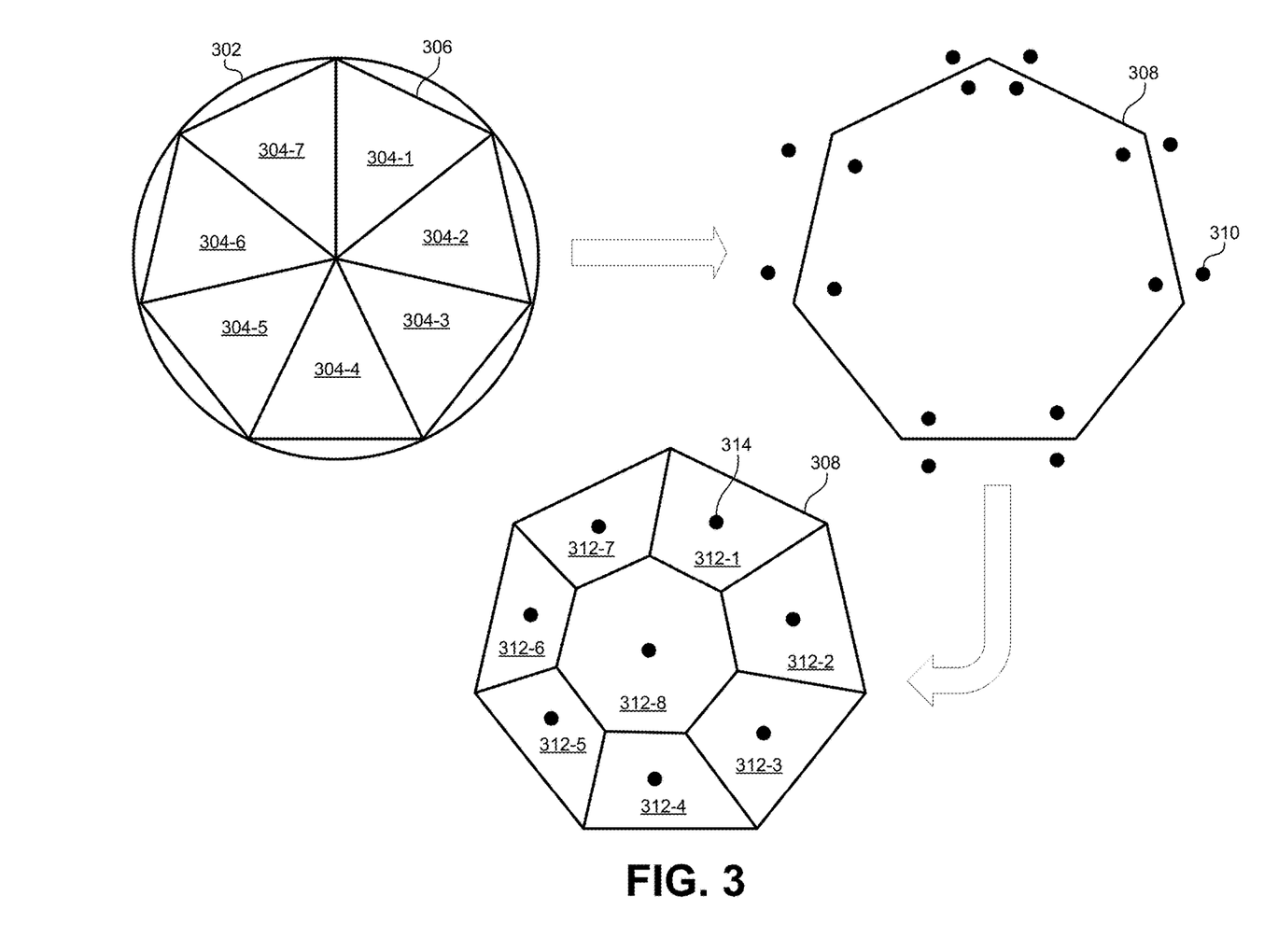
FIG. 3 illustrates a diagram of how a service represented by a user-defined set of triangles may be converted into a polyhedral mesh to simplify the simulation process, according to some embodiments.

FIG. 3 illustrates a diagram of how a service represented by a user-defined set of triangles may be converted into a polyhedral mesh to simplify the simulation process, according to some embodiments. Typically, curved surfaces are not represented by pure curves (e.g., defined by a center point and a radius) in CAD and/or simulation systems, but are instead approximated using triangles. For example, in order to represent the curved surface 302, FIG. 3 illustrates how a plurality of triangles 304 may be assembled to closely approximate the curved surface 302.

In order to translate the plurality of triangles 302 into a polyhedral mesh, the outer geometry 306 of the plurality of triangles 302 may be preserved. Therefore, the translation to the polyhedral mesh may begin by creating an external boundary 308 that matches the outer geometry 306 of the plurality of triangles 302. This ensures that the simulation process accurately reflects the complex outer geometry provided by the user while simplifying the internal geometry for simulation purposes. Some embodiments may use a Voronoi algorithm to generate a set of points 310 that are strategically located with geometric constraints such that they are equidistant from each of the boundaries on the user mesh. The set of points 310 can then be used to generate an external boundary 308 for the polyhedral mesh.

In order to generate an internal polyhedral mesh for the external boundary 308, the system may generate a regular distribution of points 314 within the external boundary 308. The density of the distribution of points 314 may be determined by a desired or specified resolution provided by the user as an input for the simulation. For example, higher resolutions may increase the number of points in the distribution of points 314. Next, the Voronoi algorithm can be used to generate the polyhedrons 312 within the external boundary 308. For example, this algorithm may be used to generate boundaries for the polyhedrons 312 that are equidistant from the distribution of points 314. This may result in an internal polyhedral mesh that can be easily simulated within an external boundary 308 that maintains the same shape as the original outer geometry 306 provided by the user mesh.

The practical effect of translating an original mesh into a polyhedral mesh is that the simulation can be performed with nearly the same accuracy, but with fewer steps. This also allows users to submit meshes in any format to the process, and the process will translate any type of mesh into a polyhedral mesh using the algorithm described above. This process can exactly replicate the external surface defined by the user-submitted mesh, while generating a polyhedral internal mesh that can be efficiently simulated. The internal polyhedral mesh can replace any internal mesh defined by the user for the purpose of efficient simulation. Generally, the polyhedral mesh generated by this specific process may be more regular than, for example, a tetrahedral mesh provided by the user, and may thus be simulated more efficiently.

In FIG. 2, a user mesh 202 may be received by the system and a mesh translation process 204 may be executed to translate the user mesh 202 into a polyhedral mesh 205. Additional modifications may be made to the random defect generation process 102 and other processes in the simulation loop to handle the polyhedral mesh. For example, the random defect generation process 102 may further transform the polyhedral mesh into a simplex grid 210 that can be easily combined with a random distribution of defects.

As described above in relation to FIG. 1 and FIG. 2, the defect generation process 102 may be used to generate a random distribution of defect locations in the semiconductor material being simulated. This process may utilize a spatial distribution function $\rho(\bar{r})$ that returns the density of the defects at each point r. For example, the distribution function $\rho(\bar{r})$ may be defined as an input to the simulation process. For meshes that are received converted into polyhedral meshes, the process may first convert the mesh into a simplex grid. For example, a polyhedral may be converted into a mesh of simplexes (e.g., triangles in 2-D, and tetrahedra in 3-D). This process is compatible with polyhedral meshes that are regular or polyhedral meshes having any irregular geometry or size. This process translates the possibly irregular mesh of the polyhedral meshes into a very regular mesh of tetrahedra. The translation of the polyhedral mesh into the tetrahedral mesh makes the mesh very compatible with the distribution of random defects as described below. Distributing defects across an irregular polyhedral mesh is very difficult computationally. Therefore, translation to the tetrahedral mesh for this step in the simulation simplifies the simulation process significantly. This simplex mesh or grid may only be needed for generating the random defects. Some embodiments may continue to use the polyhedral mesh for the subsequent steps in the simulation process. Once the coordinates or locations of the defects are determined relative to the simplex mesh, these coordinates or locations can then be used relative to the polyhedral mesh in the remaining steps.

Generating the defects according to the spatial distribution function $\rho(\bar{r})$ may first involve further refining the mesh to follow the distribution function $\rho(\bar{r})$. This refinement of the mesh may be performed by splitting cells where the distribution function $\rho(\bar{r})$ varies by more than a threshold amount. By way of example, if the variation of the distribution function p varies by more than a threshold amount between two adjacent points in the mesh, the mesh can be subdivided to create one or more additional mesh points between the original mesh such that the probability of a defect at the mesh points does not differ by an excessive amount. This mesh-refinement step changes the mesh so that it better aligns with the probability distribution of the distribution function $\rho(\bar{r})$, and thereby increases the density of the mesh where the corresponding portion of the distribution function $\rho(\bar{r})$ varies too rapidly.

Next, after the mesh has been refined, the process may randomly select a mesh cell. In some embodiments, the random selection of the mesh cell may be performed such that the selected cell satisfies the following equation.

$$\sum_{i=1}^{k-1} n_{P,i} \le r \cdot \sum_{i=1}^{N} n_{P,i} \le \sum_{i=1}^{k} n_{P,i} \tag{1}$$

In equation (1), the variable r may represent a random number generated between 0.0 and 1.0 to randomize the placement of defects according to the distribution. The variable k may represent an index of the selected cell, and the variable N may represent the total number of mesh cells. The variable $n_{P,i}$ may represent the average number of points in the i-th cell computed by integrating the distribution function inside the cell. This selection process allows the defects to be distributed according to the distribution function $\rho(\bar{r})$, while still generating a unique defect distribution with each simulation using the same distribution function $\rho(\bar{r})$.

After selecting a mesh cell using the process described above, the defect generation process may randomly generate a point inside the selected mesh cell. This may be performed by splitting the cell into elementary volumes. For example, a 3D mesh may use tetrahedra as 3D volumes. One of these elementary volumes may be randomly selected to generate a point within the selected mesh cell. Once this location has been identified, the position of the defect may be defined according to a local coordinate system for the mesh cell and the transformed into a location using the coordinate system of the simulation domain representing the mesh as a whole. This process may be repeated to select locations for each of the defects to be simulated in the mesh.

As described above in relation to FIG. 1 and FIG. 2, the simulation loop 105 may include an equation assembly 108 that generates the finite volume method equations for use in the simulation. The defects added from the defect generation process may affect these equations by attributing additional charge, power, etc., that would not be present in the simulation without the modeled defects. Therefore, the equations generated by the equation assembly 108 may include a combination of the continuum equations and the defect equations.

Figure 4:
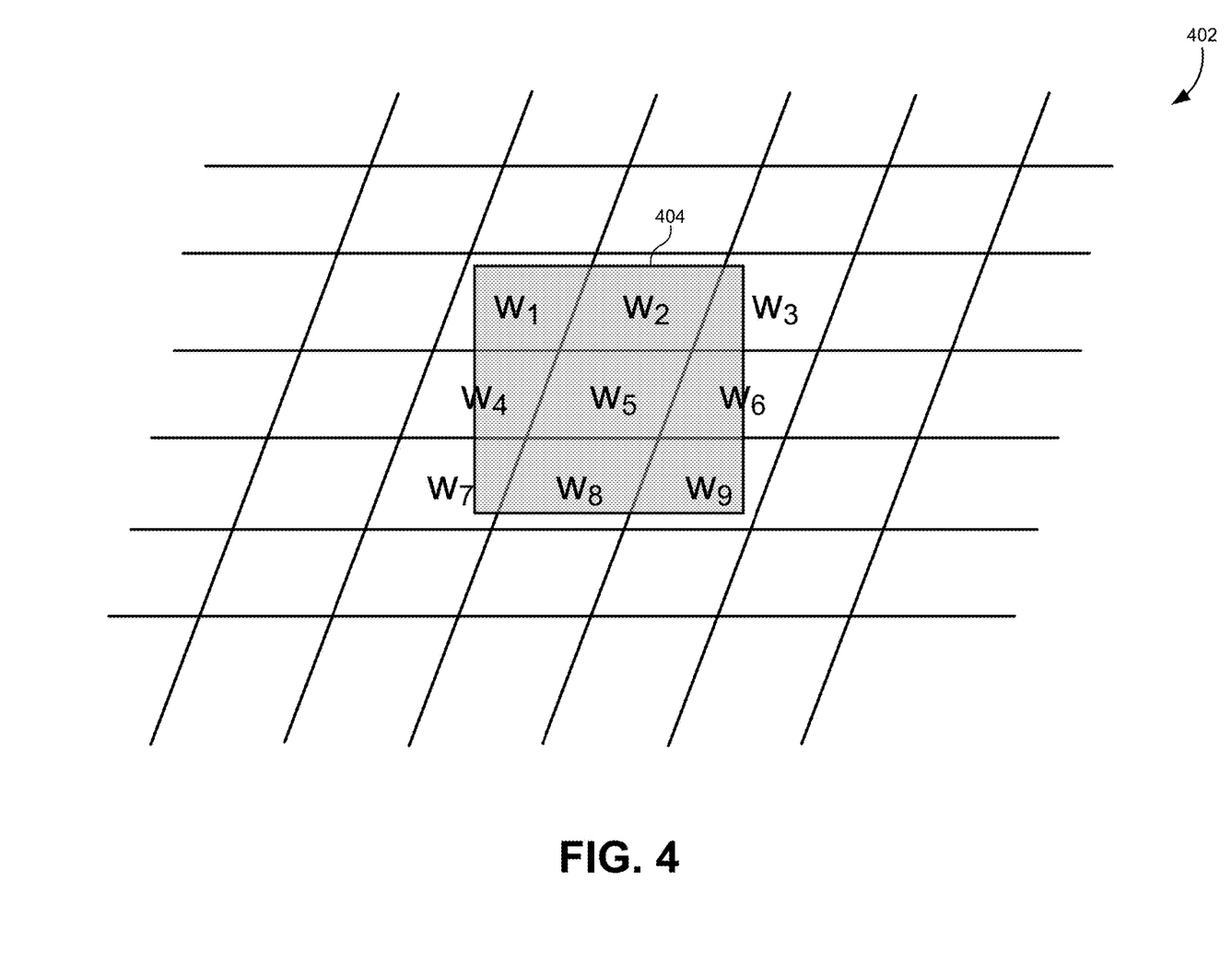
FIG. 4 illustrates a mesh with defects that overlap the mesh cells, according to some embodiments.

FIG. 4 illustrates a mesh 402 with defects that overlap mesh cells, according to some embodiments. The mesh 402 is represented in FIG. 4 as a 2D mesh for the sake of simplicity, but the same principles may be applied to a 3D mesh. Each mesh cell may have a corresponding unknown variable in the continuum equations. For example, using Poisson's equation, each mesh cell may represent an unknown amount of charge. When a defect overlaps with a mesh cell, the defect may contribute an additional amount of charge to the particular mesh cell. This process may be used to properly attribute effects of the defects to the unknown variables in the continuum equations.

In order to properly attribute the effects of a defect 404 to the corresponding locations in the mesh 402, each defect 404 may be modeled as a parallelepipedal volume centered at the defect coordinates in the mesh 402. The mesh cells that overlap the parallelepipedal volume may then be identified. In the example of FIG. 4, the defect 404 may overlap with nine adjacent mesh cells. For each of the mesh cells for which the defect 404 overlaps, a weight $w_i$ may be computed that is proportional to the overlap of the volume of the defect 404 and the mesh cell. For example, the upper right-hand cell may be assigned a weight $w_i=0.10$, as approximately 10% of the defect 404 may be attributed to this mesh cell. The weights may be normalized such that the sum of the weights for each overlapping mesh cell is calculated according to the following equation.

$$\sum_{i=1}^{N} w_i = 1 \qquad (2)$$

This process may be carried out for each of the defects in the mesh. For example, the effect of each defect may be apportioned to any of the overlapping mesh cells. Therefore, a single mesh cell may be assigned a weight from one or more of the defects that may overlap with the mesh cell. Note that this distribution of the effects of a defect may be similarly distributed for polyhedral meshes.

These computed weights can then be used as a multiplying factor in the discretization of Poisson's and Fourier's equations through finite volume methods. For example, the total charge that may be attributed to defects in a single mesh cell may be computed by summing the contribution of all of the defects overlapping with that mesh cell using the following equation.

$$Q_{DEF,i} = \sum_{j=1}^{N_i} w_{i,j} \cdot Q_j \qquad (3)$$

In equation (3), $N_i$ may represent the number of defects overlapping with mesh cell i. The weight $w_{i,j}$ may represent the weight calculated above for the j-th defect that overlaps with the i-th cell, and $Q_j$ represents the total charge assigned to the j-th defect. The resulting value $Q_{DEF,i}$ may represent the total charge contribution of all the defects with the i-th mesh cell. This same calculation may be performed for each mesh cell with at least one overlapping defect. The equation used to compute the unknown charge assigned to the i-th mesh cell may then be modified to include the charge contributed by the defect using the following equation.

$$\Phi(\overline{D}_i) = -V_i \cdot (p_i - n_i + N_{D,i} - N_{A,i}) - Q_{DEF,i} \qquad (4)$$

In equation (4), $\Phi(\overline{D}_i)$ may represent the total flux of the displacement vector $\overline{D}_i$ for the i-th cell, which may be computed numerically by summing the flux through of the cell. The value of $V_i$ may represent the cell volume, $p_i$ may represent the hole density in the cell, $n_i$ may represent the electron density in the cell, $N_{D,i}$ may represent the donor doping density of the cell, and $N_{A,i}$ may represent the acceptor doping density in the cell. In addition to these terms that may be attributed to the cell alone, equation (4) also includes the $Q_{DEF,i}$ term calculated above for the contribution of any defects that overlap with the mesh cell. Therefore, equation (4) represents Poisson's equation in a form that may be simulated to account for the charge contribution made by the defect distribution that has been applied to the mesh for the semiconductor device.

A similar process may be carried out for any other continuum equations used in the simulation. For example, the same weights may be used to distribute a power contribution for each defect that may be added to Fourier's equation. The simulation may compute any power contributed by the overlapping defects may be added to Fourier's equation when calculating the unknown temperature for mesh cell.

In addition to altering Poisson's equation and Fourier's equation, some embodiments may also use a charge continuity equation to model how defects exchange charge with mesh cells through Trap-Assisted Tunneling. This process models how a defect can exchange charge with the surrounding semiconductor material being modeled. Specifically, just as defects can be coupled to Poisson's and Fourier's equations, so too can defects be coupled to the drift and diffusion equations used in simulation to model how charge moves through the device.

Figure 5:
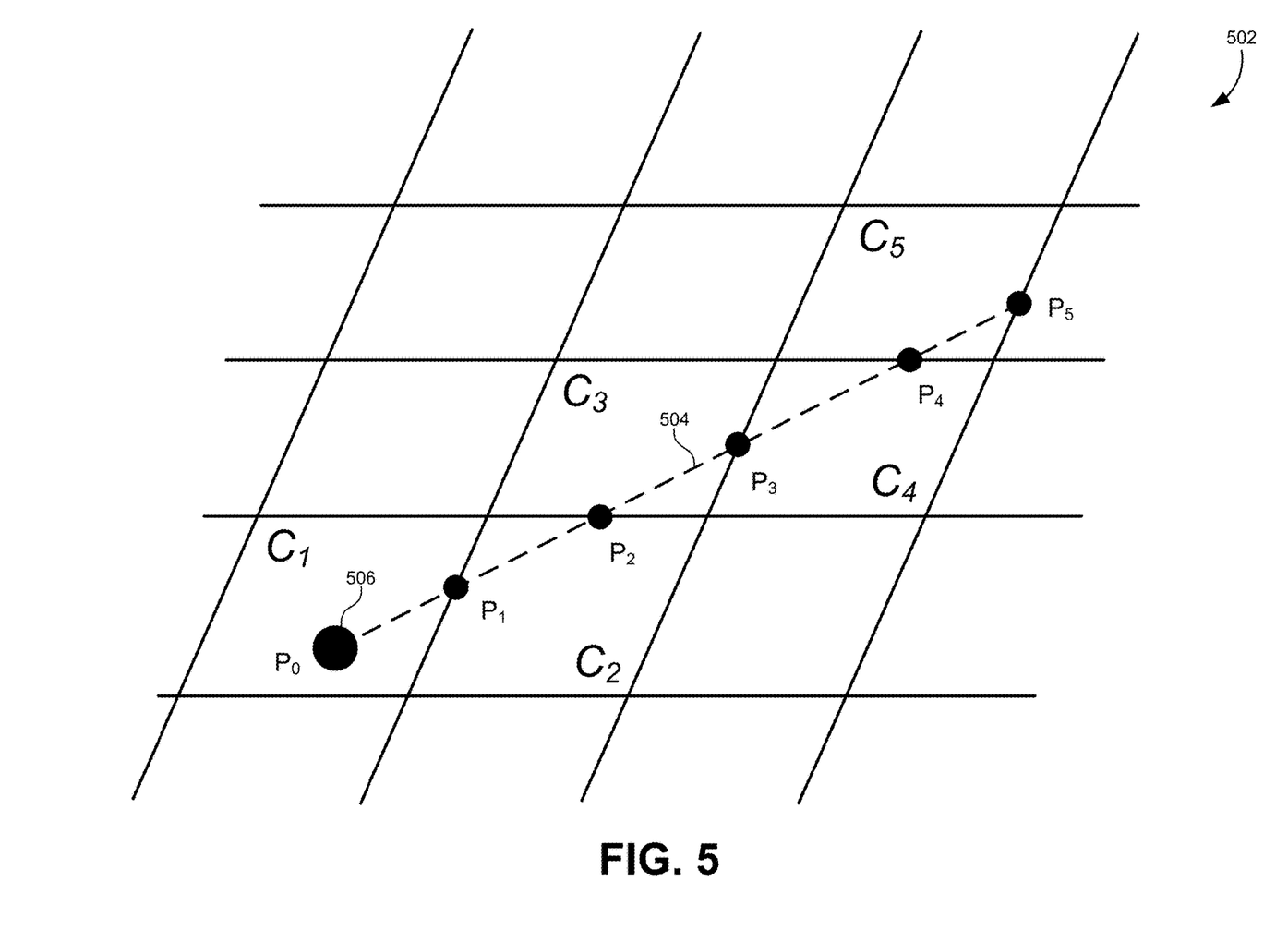
FIG. 5 illustrates how a charge transition rate may be attributed to each mesh cell, according to some embodiments.

FIG. 5 illustrates how a charge transition rate may be attributed to each mesh cell, according to some embodiments. In order to compute the charge transition rates between each defect in the surrounding polyhedral mesh cells, one or more preferential tunneling directions may be identified. These preferential tunneling directions may depend on the geometry of the device being simulated. For example, a tunneling trajectory 504 may be established in a tunneling direction.

Once a tunneling trajectory 504 has been established, a tracking algorithm may be used to identify mesh cells that are crossed by the tunneling trajectory 504 based the point of intersection with the mesh cell boundaries. For example, FIG. 5 illustrates five mesh cells ($C_1, \ldots C_5$) that intersect with the tunneling trajectory 504 for a defect 506. Intersection points ($P_1, \ldots P_5$) may then be identified for each intersection between the boundaries of the mesh cells in the tunneling trajectory 504. The tunneling transition rates between the defect and the i-th mesh cell may be computed to account for electrical potential drops along the cells using the following equation.

$$R_i = R_{TAT,i} \cdot (V(P_i) - V(P_{i-1})) \tag{5}$$

In equation (5), $R_{TAT,i}$ may represent the Trap Assisted Tunneling (TAT) rate per unit energy between the defect and the mesh cell as computed using standard Trap Assisted Tunneling theory, $V(P_i)$ may represent the electrical potential at the corresponding point $P_i$, where $P_0$ represents the defect location in the coordinate system. The transition rate $R_i$ may then be incorporated into the drift and diffusion equations in the simulation. Note that this same procedure may be carried out using a polyhedral mesh from FIG. 2, although the computations may be slightly more difficult.

The TAT rate may then be integrated into the drift diffusion equation using the following equation.

$$\frac{dn_i}{dt} = \sum_{k=1}^{N_f} \frac{A_k \cdot J_{DD,k}}{q} + \sum_{k=1}^{N_T} \{R_{TAT,IN,k,i} \cdot P_{T,k} - R_{TAT,OUT,k,i} \cdot (1 - P_{T,k})\} \tag{6}$$

Equation (6) imposes the electron charge conservation in the i-th mesh cell. In equation (6), $n_i$ may represent the electron density in the i-th mesh cell, t may represent the time, $N_f$ may represent the number of faces of the cell, $A_k$ may represent the area of the k-th face of the cell, $J_{DD,k}$ may represent the net electron drift-diffusion current entering the cell through the k-th face, q may represent the electron charge, $N_T$ may represent the number of defects, $P_{T,k}$ may represent the occupancy of the k-th defect, $R_{TAT,IN,k,i}$ may represent the electron TAT input rate from the k-th defect to the i-th mesh cell, and $R_{TAT,OUT,k,i}$ may represent the electron TAT output rate from the i-th mesh cell to the -th defect. Note that a similar equation imposing the hole charge conservation in the i-th mesh cell may also be used.

Figure 6:
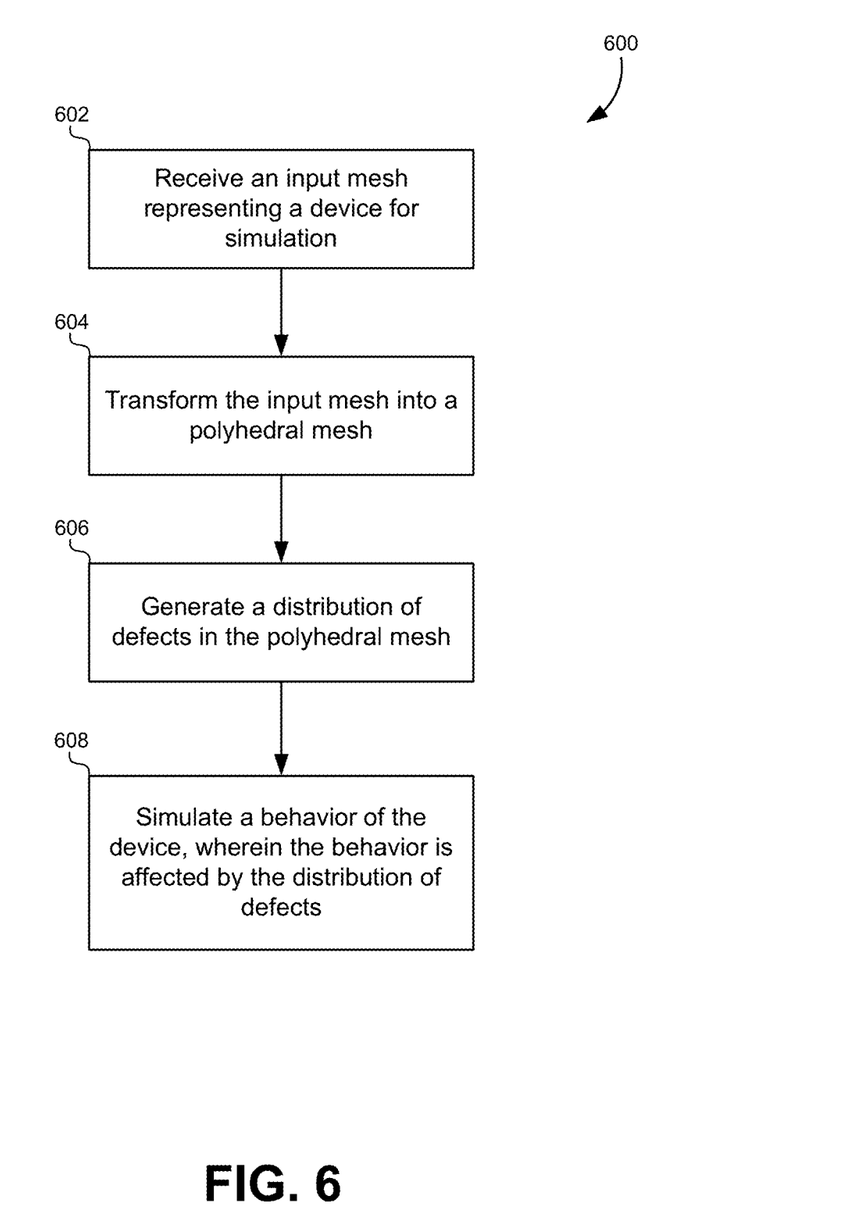
FIG. 6 illustrates a flowchart of a method of simulating atomistic defects and electronic devices, according to some embodiments.

FIG. 6 illustrates a flowchart 600 of a method of simulating atomistic defects and electronic devices, according to some embodiments. The method may include receiving an input mesh representing a device for simulation (602). The device may represent a semiconductor device or an electronic device, and the simulation may include a material, such as a semiconductor, in which a distribution of defects may be generated to provide a more realistic simulation. The input mesh may be a user-defined mesh that includes an irregular tetrahedral mesh, or any other type of mesh. By way of example, the mesh may include a curved surface that is approximated using a plurality of triangles.

The method may also include transforming the input mesh into a polyhedral mesh (604). The polyhedral mesh may be generated by first generating an external boundary that matches an outer geometry of the input mesh. A distribution points may then be distributed or generated within the external boundary, and the density of the distribution may correspond to a user input indicating a desired or specified resolution (e.g., a spatial resolution) of the simulation. An algorithm may be used to generate boundaries for polyhedra that are equidistant from the nearest points in the distribution. The resulting polyhedral mesh may be more regular than the input mesh, and may consequently be easier to simulate and require less computing resources for the simulation process.

The method may additionally include generating a distribution of defects in the polyhedral mesh (606). Before generating the distribution of defects, the polyhedral mesh may be transformed into a simplex grid or simplex mesh, such as a regularly-spaced mesh of tetrahedra. The distribution of defects may then be generated relative to the simplex grid based on a distribution function. The remainder of the simulation may use the polyhedral mesh with the distribution of defects that were generated based on the simplex grid.

The method may further include simulating a behavior of the device (608). When defects are added to the device, the behavior of the device may be affected by this distribution of defects. For example, as described in detail above, power contributions may be computed for the distribution of defects and incorporated into Fourier's equation for each of the affected polyhedra in the polyhedral mesh for each time step in the simulation. In another example, charges or charge contributions may be computed for the defects and incorporated into Poisson's equation for each of the affected polyhedra in the mesh. Additional operations may be performed at each time step of the simulation as described above.

It should be appreciated that the specific steps illustrated in FIG. 6 provide particular methods of simulating the effect of defects in a device according to various embodiments. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system.

Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 7:
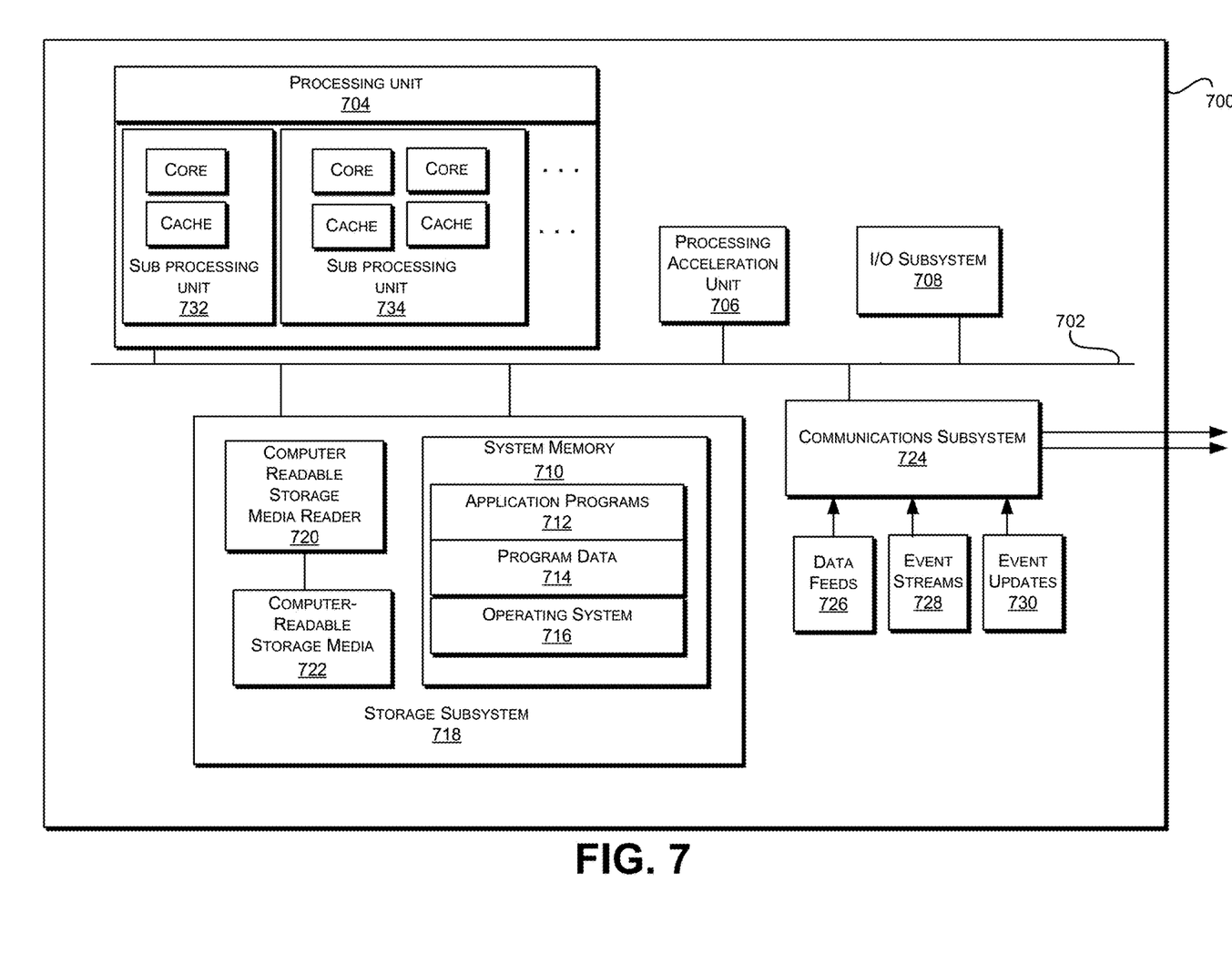
FIG. 7 illustrates an exemplary computer system, in which various embodiments may be implemented.

FIG. 7 illustrates an exemplary computer system 700, in which various embodiments may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with some embodiments.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of simulating atomistic defects in electronic devices, the method comprising:
   receiving an input mesh representing a device for simulation;
   transforming the input mesh into a polyhedral mesh;
   generating a distribution of defects in the polyhedral mesh;
   for each defect in the distribution of defects:
     identifying polyhedra in the polyhedral mesh that overlap with an effect of the defect;
     distributing the effect of the defect to the polyhedra in the polyhedral mesh; and
   simulating a behavior of the device, wherein the behavior is affected by the distribution of defects.

2. The method of claim 1, wherein transforming the input mesh into the polyhedral mesh comprises:
   generating an external boundary that matches an outer geometry of the input mesh; and
   generating polyhedrons within the external boundary to form the polyhedral mesh.

3. The method of claim 1, wherein transforming the input mesh into the polyhedral mesh comprises:
   generating a distribution of points within an external boundary; and
   generating boundaries for polyhedra in the polyhedral mesh that are equidistant from points in the distribution of points.

4. The method of claim 3, wherein a density of the distribution of points is provided as an input to the simulation corresponding to a specified resolution of the simulation.

5. The method of claim 1, wherein the polyhedral mesh is more regular than the input mesh.

6. The method of claim 1, wherein the input mesh represents a physical structure for a semiconductor material.

7. The method of claim 1, wherein the input mesh comprises a user-defined mesh that uses more computing resources to simulate than the polyhedral mesh.

8. A non-transitory computer-readable medium comprising instructions that, when executed by one or more processors, cause the one or more processors to perform operations comprising:
- receiving an input mesh representing a device for simulation;
- transforming the input mesh into a polyhedral mesh;
- converting the polyhedral mesh into a simplex grid;
- generating a distribution of defects in the polyhedral mesh
- determining locations of the distribution of defects relative to the simplex grid; and
- simulating a behavior of the device, wherein the behavior is affected by the distribution of defects, wherein the locations of the distribution of defects are used with the polyhedral mesh when simulating the behavior of the device.

9. The non-transitory computer-readable medium of claim 8, wherein the simplex grid comprises a regular mesh of tetrahedra.

10. The non-transitory computer-readable medium of claim 8, wherein generating the distribution of defects in the polyhedral mesh comprises:
- generating the distribution of defects based on a distribution function relative to the simplex grid.

11. The non-transitory computer-readable medium of claim 8, wherein the operations further comprise:
- for each defect in the distribution of defects, identifying polyhedra in the polyhedral mesh that overlap with an effect of the defect; and
- distributing the effect of the defect to the polyhedra in the polyhedral mesh.

12. The non-transitory computer-readable medium of claim 11,
- wherein distributing the effect of the defect comprises:
- generating weights for each of the polyhedra that represent a corresponding effect of the defect distributed to each of the polyhedral.

13. The non-transitory computer-readable medium of claim 8, wherein simulating a behavior of the device comprises:
- computing charges for the distribution of defects and incorporating the charges into Poisson's equation for each affected polyhedra in the polyhedral mesh; and/or
- computing power contributions for the distribution of defects and incorporating the power contributions into Fourier's equation for each affected polyhedra in the polyhedral mesh.

14. The non-transitory computer-readable medium of claim 8, wherein transforming the input mesh into the polyhedral mesh comprises:
- generating a distribution of points within an external boundary; and
- generating boundaries for polyhedra in the polyhedral mesh that are equidistant from points in the distribution of points, wherein a density of the distribution of points is provided as an input to the simulation corresponding to a specified resolution of the simulation.

15. A system comprising:
one or more processors; and
one or more memory devices comprising instructions that, when executed by the one or more processors, cause the one or more processors to perform operations comprising:
- receiving an input mesh representing a device for simulation;
- transforming the input mesh into a polyhedral mesh;
- generating a distribution of defects in the polyhedral mesh; and
- simulating a behavior of the device, wherein the behavior is affected by the distribution of defects by:
- computing charges for the distribution of defects and incorporating the charges into Poisson's equation for each affected polyhedra in the polyhedral mesh; and/or
- computing power contributions for the distribution of defects and incorporating the power contributions into Fourier's equation for each affected polyhedra in the polyhedral mesh.

16. The system of claim 15, wherein the operations further comprise determining a tunneling trajectory for a defect in the distribution of defects as the defect moves between cells in the polyhedral mesh.

17. The system of claim 15, wherein transforming the input mesh into the polyhedral mesh comprises:
- generating an external boundary that matches an outer geometry of the input mesh;
- generating a distribution of points within the external boundary; and
- generating boundaries for polyhedrons in the polyhedral mesh that are equidistant from points in the distribution of points.

18. The system of claim 17, wherein a density of the distribution of points is provided as an input to the simulation corresponding to a specified resolution of the simulation.

19. The system of claim 15, wherein the polyhedral mesh is more regular than the input mesh.

20. The system of claim 15, wherein the input mesh comprises a user-defined mesh that uses more computing resources to simulate than the polyhedral mesh.

* * * * *